J. W. ASHWORTH.
COMPUTING SCALE.
APPLICATION FILED JULY 15, 1912.
1,197,586. Patented Sept. 12, 1916.
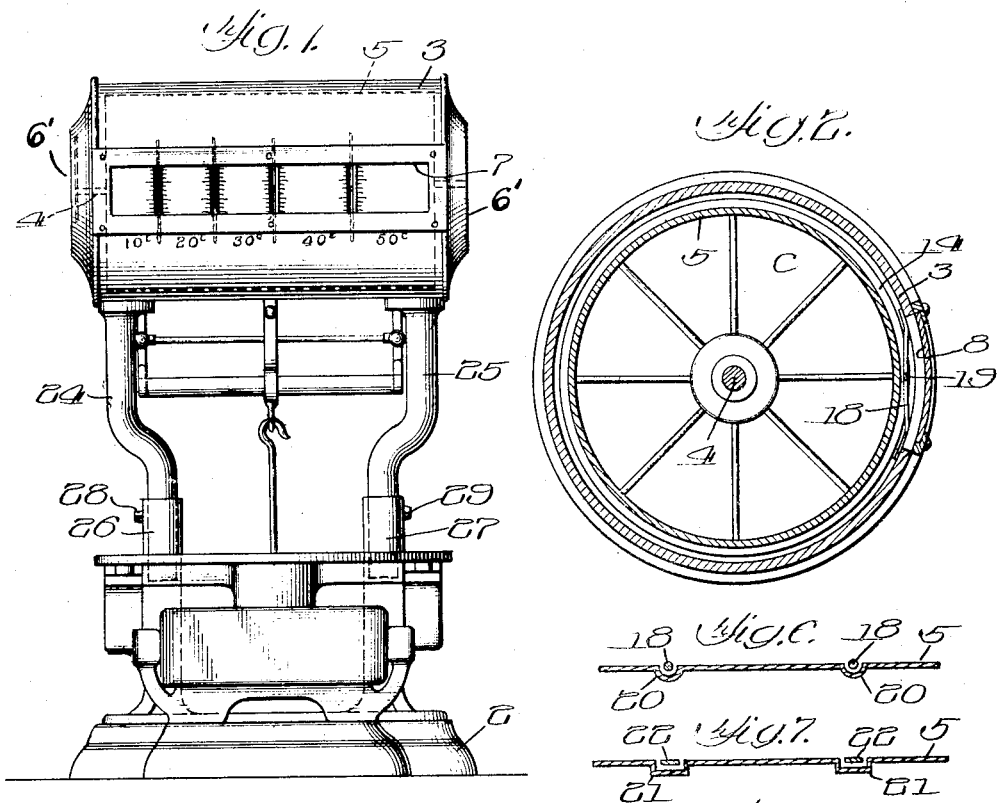
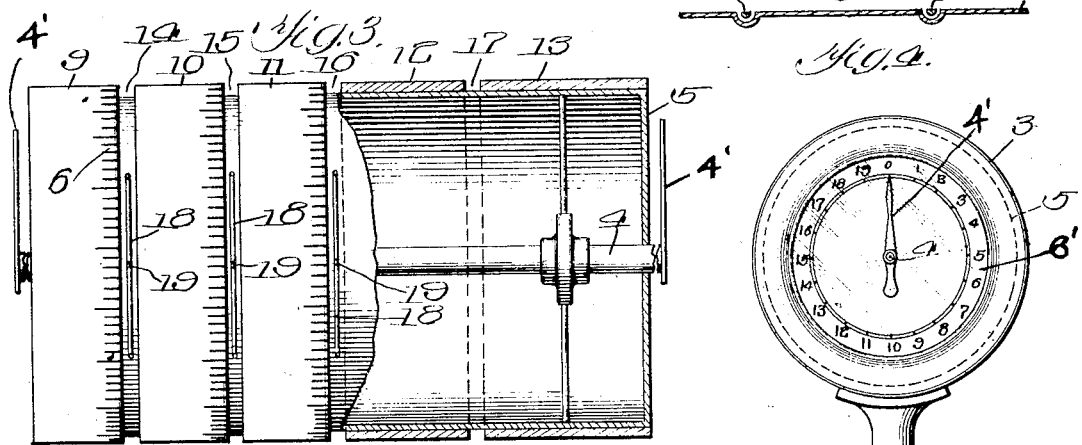
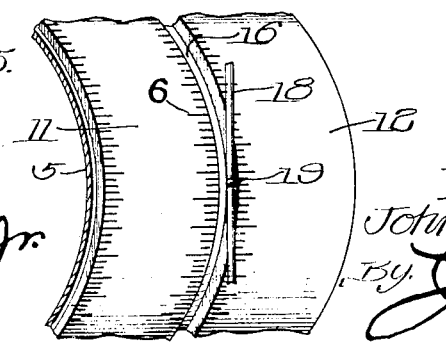
Witnesses:
Jno. H. Nelson Jr.
Edwin B. Nelson
Inventor:
John W. Ashworth.
By James Beckstrom
Atty.

UNITED STATES PATENT OFFICE.

JOHN WILLIAM ASHWORTH, OF NEW YORK, N. Y.

COMPUTING-SCALE.

1,197,586. Specification of Letters Patent. Patented Sept. 12, 1916.

Application filed July 15, 1912. Serial No. 709,347. REISSUED

*To all whom it may concern:*

Be it known that I, JOHN W. ASHWORTH, a citizen of the United States, residing in the city and county of New York and State of New York, have invented certain new and useful Improvements in Computing-Scales, of which the following is a specification.

This invention relates to weighing scales and has particular reference to the computing types thereof.

The objects of the invention are to increase the accuracy of the readings of the scale's computations, to make the scale adjustable to the scale-reader's height so as to further facilitate correct readings, and to provide separate and distinct charts showing the pounds unencumbered by the markings showing the money values.

To these ends the invention consists in the novel construction of scale, combination and arrangement of parts, as hereinafter described in detail, illustrated in the accompanying drawing and incorporated in the appended claims.

In the drawing—Figure 1 is a front elevation of a complete scale embodying my invention. Fig. 2 is an enlarged transverse section of the cylindrical upper part of the scale. Fig. 3 is an enlarged view, partly broken away, of the revolving cylindrical portion which contains the money value chart and reading lines and the hands or indicators which coöperate with the pound-indicating charts on the two ends of the upper casing. Fig. 4 is an end view of the upper casing showing one of the pound charts or scales. Fig. 5 is a broken away portion of the chart and wire. Figs. 6, 7, and 8 show modifications in the construction of wire-grooves or spaces and reading-line wires.

In the usual construction of this class of scales the reading line extends some distance in front of the chart, or away from it, and necessarily so in order to avoid friction between the chart-bearing drum or cylinder and the wire, scale or bar forming the reading line or on which same is marked. The result is that the line of sight may strike the chart either above or below the horizontal plane of the reading line according to the height of the reader. If the reader is a short person and the reading line is elevated above the horizontal plane of his eyes his line of sight will strike the chart above the reading line, and if he is a tall person his line of sight may strike the chart below the horizontal plane of the reading line. In my improved construction the reading line is arranged substantially on the circle of the chart-lines or aline with the chart-line that is to be read. My improvement also contemplates variations in the height of the position of the chart or cylinder itself above the base of the scale so as to bring the reading line into or near to the horizontal plane of the user's eyes, or, in other words, to make his line of vision as nearly horizontal as possible.

In the several views 2 represents the base of an ordinary form of scale which is the receptacle for the usual mechanism contained in said base.

3 is the upper portion of the scale, which in this instance is of a well known cylindrical form and represents a shell or casing within which is rotatively mounted on a shaft 4 a cylinder 5 containing a chart or graduations 6 or other suitable computing characters which are made visible to the operator through an opening 7 covered with a glass 8. On the cylinder 5 is mounted a series of rings or bands 9, 10, 11, 12 and 13 which are spaced apart to leave grooves 14, 15, 16 and 17 in each of which back of the glass 8 is mounted a wire 18 the ends of which wire are secured by soldering or otherwise, to the inner periphery of the cylindrical casing 3 as shown in Fig. 2. On substantially the middle of the wire 18 is a dot or mark 19, these dots being alined to form what is termed the "reading line." The reading line marks on the wires are arranged flush with the chart-surface of the rotating cylinder 5 by arranging the marked portions of said wires in the grooves as shown.

In Figs. 6, 7 and 8 instead of the bands or rings 9 to 13 on the drum 5 the latter is provided with corrugations 20 that are semicircular in cross section or rectangular corrugations 21 which take the place of the bands or rings. In said modified views the wire 18 is also shown in the form of a flat wire or strip of metal 22 or of half round form 23. Many other modifications may be made in these details.

By placing the reading point or line of the wire 18 in the manner indicated the reading line will be the same for tall as for short persons with reference to the marks or characters on the chart, being in the same plane as said characters with reference to the line of vision, or in other words, in the plane of said line of vision.

Referring, now, to the adjustment of the chart-portion of the scale with reference to the base-portion, 24 and 25 represent bent supports or uprights which extend from the casing 3 and have their lower ends slidably adjustable in socket portions 26 and 27 which rise from the base 2 and are adjustably supported in said socket portions by means of set screws, or other suitable means, 28 and 29. These telescoping parts may be extended to the number desired according to the range of adjustment required, the invention not being restricted to the particular construction shown.

The pound markings are on annular dials 6' on the ends of the case 3, as shown in Fig. 4. An indicator, pointer or hand 4' is arranged on each end of the shaft 4 in the plane of the dial 6', as shown in Figs. 1 and 4 to coöperate with the pound-markings 6'. Thus the device provides a stationary pound chart at each end with a movable hand actuated by the revoluble chart showing the money values, or its shaft or axis 4. The pointer at each end is thus alined with each graduation that it points to which insures the same accuracy in reading that the arrangement of the reading line for the cylindrical chart affords. The simple and easily understood pound scale is thus preserved in connection with the computing scale without the addition of any mechanism other than the provision of the pointers 4'.

Having thus described my invention, I claim as new and desire to secure by Letters Patent—

1. The combination with a casing, of a cylindrical chart rotatably mounted within said casing, said chart having a circumferential series of graduations thereon, and having an annular depression or channel in its periphery, and an indicator arranged to be alined with each of said graduations in said depression or channel.

2. The combination in a computing scale, of a cylinder having a chart thereon with peripheral graduations thereon and a series of channels in its periphery and a reading line composed of a series of alined indicator points mounted in said channels substantially on the circle of said graduations.

3. The combination with the revolving cylindrical chart of a computing scale having a series of annular depressions therein and graduations marked thereon, of a reading line arranged substantially in the circle of said graduations, and means for elevating or lowering said reading line.

4. The combination with the reading chart cylinder of a computing scale, having a series of annular grooves in its outer periphery, of a series of upright wires having a reading line thereon, said wires having their reading line portions arranged in said grooves, a base upon which said cylinder is mounted and adjustable telescopic standards connecting said base and cylinder.

5. In a computing scale the combination with a revoluble money-value chart, of a stationary indicating point or reading line wire, a pointer mounted on the axis of said money-value chart, a stationary pound-chart, and means for adjusting the height of said charts to adjust same to the vision of the reader of said charts and point and pointer.

In testimony whereof I have hereunto set my hand in the presence of two subscribing witnesses.

JOHN WILLIAM ASHWORTH.

Witnesses:
IRVING M. KESTIN,
GEORGE H. PETERSON.